United States Patent [19]

Venkataperumal et al.

[11] 4,270,806
[45] Jun. 2, 1981

[54] COMBINED HYDRAULIC AND REGENERATIVE BRAKING SYSTEM

[75] Inventors: Rama R. Venkataperumal, Troy; Gerald E. Mericle, Mount Clemens, both of Mich.

[73] Assignee: The United States of America as represented by the United States Department of Energy, Washington, D.C.

[21] Appl. No.: 65,033

[22] Filed: Aug. 9, 1979

[51] Int. Cl.$^3$ ............................................. B60T 13/74
[52] U.S. Cl. .................................... 303/3; 188/159
[58] Field of Search .............. 188/159, 160; 192/2; 303/3, 15, 16, 20

[56] References Cited

U.S. PATENT DOCUMENTS

| | | | |
|---|---|---|---|
| 2,591,224 | 4/1952 | Williams et al. | 303/3 |
| 3,275,380 | 9/1966 | May | 303/3 |
| 3,536,361 | 10/1970 | Engle | 303/3 |

Primary Examiner—Duane A. Reger
Attorney, Agent, or Firm—Clifton E. Clouse, Jr.; Roger S. Gaither; James E. Denny

[57] ABSTRACT

A combined hydraulic and regenerative braking system and method for an electric vehicle, with the braking system being responsive to the applied hydraulic pressure in a brake line to control the braking of the vehicle to be completely hydraulic up to a first level of brake line pressure, to be partially hydraulic at a constant braking force and partially regenerative at a linearly increasing braking force from the first level of applied brake line pressure to a higher second level of brake line pressure, to be partially hydraulic at a linearly increasing braking force and partially regenerative at a linearly decreasing braking force from the second level of applied line pressure to a third and higher level of applied line pressure, and to be completely hydraulic at a linearly increasing braking force from the third level to all higher applied levels of line pressure.

7 Claims, 4 Drawing Figures

COMBINED HYDRAULIC AND REGENERATIVE BRAKING SYSTEM

BACKGROUND OF THE INVENTION

The invention disclosed herein arose under, or in, the course of U.S. Department of Energy Contract No. EY-76-C-03-1294 with General Electric Company and Purchase Order No. 002-218473, with Chrysler Corporation.

The present invention relates to hydraulic and regenerative braking systems, and more particularly, it relates to a braking system in which the hydraulic and regenerative braking effects are blended appropriately under varying conditions to provide smooth safe braking.

In many electro-mechanical systems wherein large masses are in motion, it is often desirable to convert the energy of the moving mass into electrical energy and feed it back into the electrical system for further use. Such conversion is especially desirable in self-propelled vehicles such as automotive electric vehicles where the electric source takes up substantial space and constitutes a large proportion of the vehicle weight. In this case, conversion of the energy of the moving vehicle into electrical energy for recharging the electrical source such as by regenerative braking raises the efficiency of the system. The increased efficiency may be used to lower the energy requirements of the source, increase the range of the vehicle, or reduce the space or weight requirements for the source. It is desirable, however, when accomplishing regenerative braking, such as in an electric automobile, that the braking system as a whole provide the same degree of braking for the same force and amount of foot depression as a conventional traditional hydraulic automotive braking system so that no special driver training is necessary.

It is also desirable to have a combined hydraulic and regenerative braking system as opposed to a fully hydraulic or fully regenerative braking system for the following reasons: in a fully hydraulic braking system, all of the kinetic energy of the decelerating vehicle is wasted as heat dissipation in the brakes and is not recovered; in a fully regenerative system, the electric current intake capability of the batteries, without damaging the batteries due to overheating at high levels of input current, is limited and this limitation in turn limits the amount of regenerative torque that may be applied to braking; and regenerative braking, unless supplemented by hydraulic braking, has not been found to be adequate to meet the Federal automotive braking requirements.

It is further desirable that a combined hydraulic and regenerative braking system should also be a fail-safe system wherein full hydraulic braking is restored by bypassing the regenerative part of the braking system when there is an electrical failure. It is also desirable that the regenerative part of a combined system be bypassed when the main propulsion batteries are fully charged and will not accept further charge, or when both the accelerator and brake pedals are applied simultaneously, or the vehicle speed is less than a preset limit, or there is hard brake application.

It is therefore an object of the invention to provide a combined hydraulic and regenerative braking system in which regenerative braking efforts are optimized.

Another object is to conserve energy in an electric vehicle by providing regenerative braking supplemented by hydraulic braking for safe smooth braking at all vehicle speeds.

Another object is to provide in an automotive electrical vehicle a combined hydraulic and regenerative braking system that responds to brake pedal effort with the same degree of braking as a conventional traditional hydraulic automotive braking system.

Another object is to provide a braking system having hydraulic and regenerative braking that is blended appropriately under varying conditions to provide smooth safe braking.

Another object is to appropriately bypass the regenerative portion of a combined hydraulic and regenerative braking system.

Another object is to provide a fail-safe method of restoring full hydraulic braking in a combined hydraulic and regenerative braking system.

Another object is to provide a braking system that is fully capable of meeting Federal braking performance standards for passenger vehicles.

SUMMARY OF THE INVENTION

In brief, the invention is a combined hydraulic and regenerative braking system that is responsive to a source of hydraulic brake line pressure to provide hydraulic and regenerative braking effects that are blended appropriately at predetermined levels of line pressure to obtain smooth safe braking and optimum electrical regeneration for conservation of energy.

Other objects and advantageous features of the invention will be apparent in a description of a specific embodiment thereof, given by way of example only, to enable one skilled in the art to readily practice the invention which is described hereinafter with reference to the accompanying drawing.

DETAILED DESCRIPTION OF THE INVENTION

Reference will now be made in detail to a present preferred embodiment of the invention, an example of which is illustrated in the accompanying drawing. While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined in the appended claims.

Figure 1:
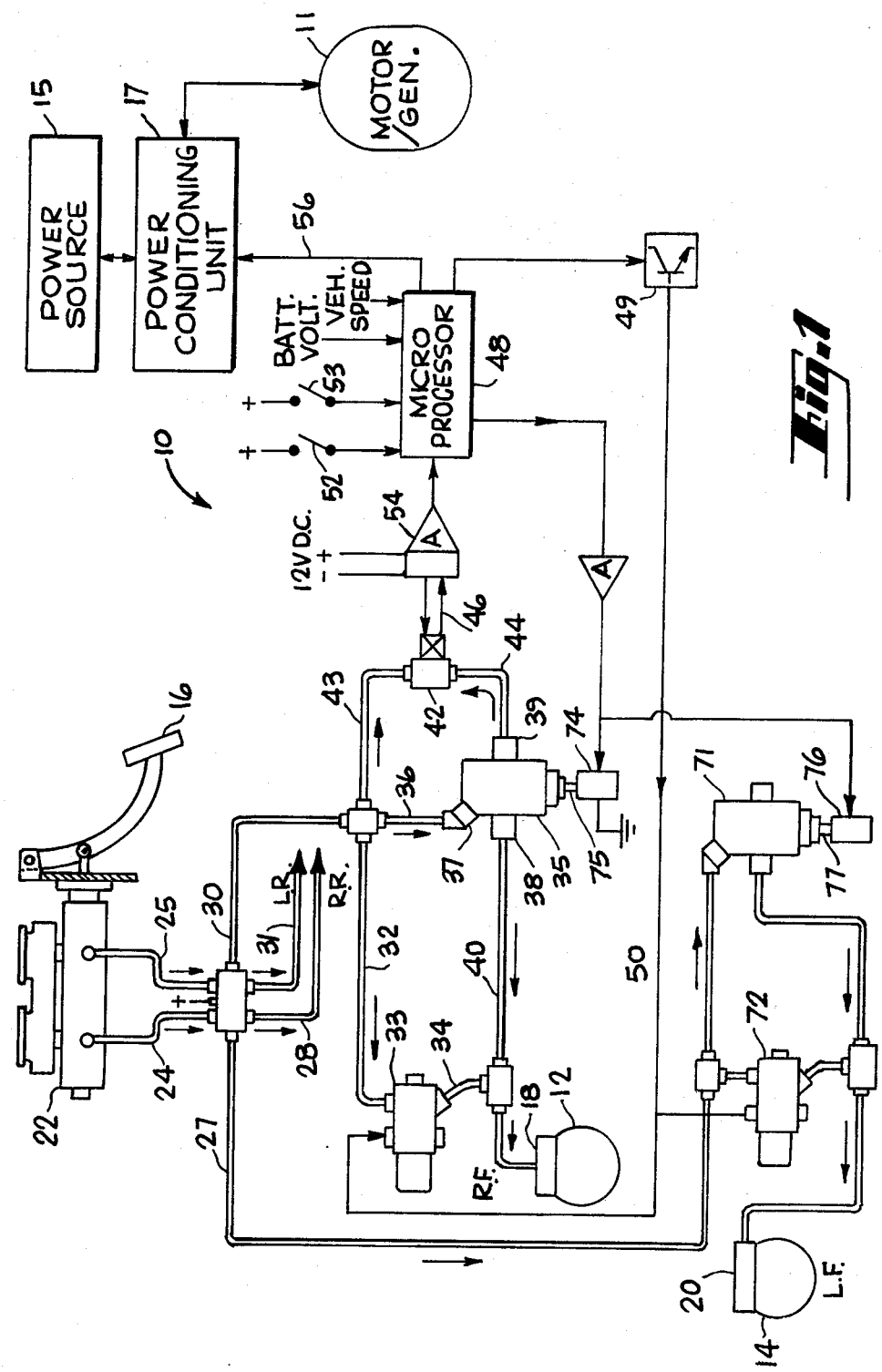
FIG. 1 is a schematic diagram of a hydraulic and electrical control system of a combined hydraulic and regenerative braking system, according to the invention.

Referring now to the drawing, there is shown in FIG. 1 a schematic diagram of a hydraulic and electrical control system 10 for braking an electric vehicle. The vehicle includes a motor generator 11 for driving a right front wheel 12 and a left front wheel 14 when the motor generator 11 is operated as a motor. The motor generator 11 also may be operated as a generator for applying a braking force to the wheels 12 and 14 and supplying regenerative power to a power source 15 such as a battery through utilization of a power conditioning unit 17 such as described in *Near-Term Electric Vehicle Phase II—Mid Term Summary Report,* submitted by General Electric Company to the U.S. Department of Energy, technical report No. SRD-78-073, which report is incorporated herein by reference, the power conditioning unit being defined on page 1-17 with details disclosed starting on page 3.2-1.

Figure 2:
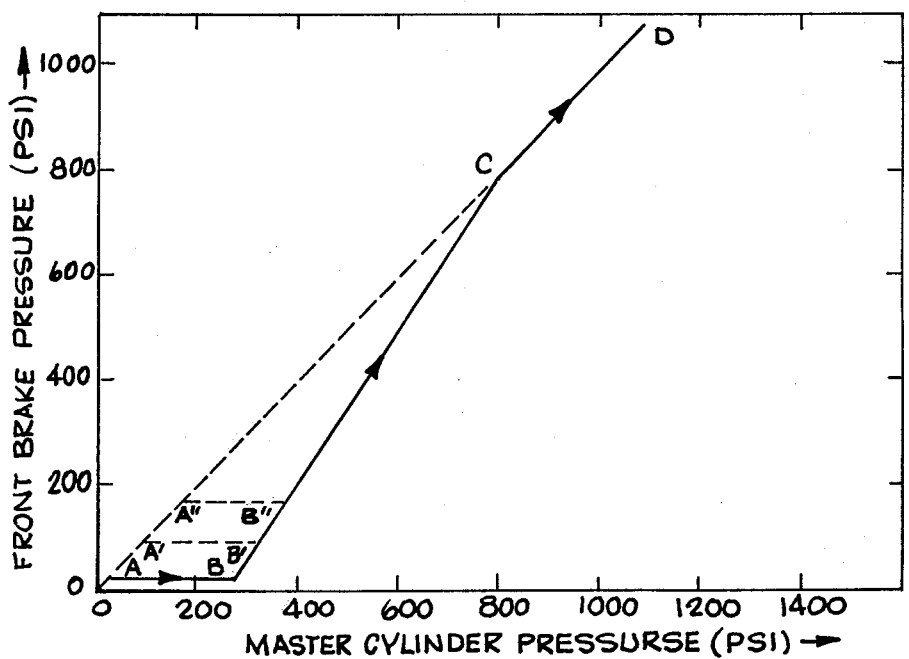
FIG. 2 is an illustrative pressure diagram showing brake line hydraulic pressure levels at wheels to be braked as a function of hydraulic line pressures from a master cylinder, and further shows the pressure level points at which regenerative braking is combined with hydraulic braking, for the system of FIG. 1.

Braking of the electric vehicle by use of the system 10 is initiated by application of foot pressure to a brake pedal 16. The system 10 is arranged so that the effort required to depress the pedal 16 is substantially the same as the effort required in a traditional conventional hydraulic system to achieve an equal braking effect. In order to achieve this equal braking effort, a conventional hydraulic braking system is provided for each of the four wheels and includes a conventional right front brake assembly 18 and a conventional left front brake assembly 20 for braking the wheels 12 and 14 respectively in response to depression of the brake pedal 16. However, the system 10 also provides, in response to depression of the brake pedal 16, for supplementing the braking of the wheels 12 and 14 with regenerative braking by the motor generator 11. This combined hydraulic and regenerative braking effect is illustrated in FIG. 2 which is an illustrative pressure diagram showing the pressure levels at the output of a master cylinder 22 which is actuated by depression of the brake pedal 16. The output from the cylinder 22 appears in hydraulic lines at 24 and 25 equally, with the pressure line 24 being applied to the left front and right rear wheels of the vehicle over lines 27 and 28 respectively, and the pressure in line 25 being applied to the right front and left rear wheels of the vehicle over lines 30 and 31 respectively. Since regenerative braking is to be applied only to the front wheels, it is necessary that the total effect of the regenerative braking and hydraulic braking of the front wheels be in balance with the completely hydraulic braking of the rear wheels. This is illustrated in FIG. 2 wherein the pressure in lines 24 and 25 (master cylinder pressure) is the same as the pressure applied to the front and rear brakes and will continue to be the same as the pressure in lines 24 and 25 when there is no regenerative braking. This condition of no regenerative braking, i.e. completely hydraulic braking, is illustrated by the straight line from 0 to D. However, the system 10 is designed so that when regenerative braking is introduced, the amount of hydraulic braking is diminished to an extent that the total braking effect remains constant and follows the straight line from 0 to D. This is accomplished in the system 10 by controlling the hydraulic pressure levels at the front brake assemblies to correspond to levels represented by the line 0 to A, A to B, B to C, and C to D, while controlling the motor generator 11 to regeneratively brake in such an amount that the combination of the hydraulic effect and regenerative effect causes braking of the front wheels equal to the braking effect represented by the straight line 0 to D for equal master cylinder pressures.

The braking effect represented in FIG. 2 is accomplished by means of the system 10 wherein in response to initial depression of brake pedal 16 a hydraulic pressure is created by means of the master cylinder 22 in lines 25 and 30. This pressure is applied over a hydraulic line 32 to a solenoid-operated valve 33 having a normally open passage for connecting line 32 to a hydraulic line 34. Line 34 is connected directly to the right front brake assembly 18 so that with the passage open, master cylinder pressure is applied directly to the brake cylinder of assembly 18 which includes pads or shoes to brake the wheel 12 in conventional manner. Simultaneously, master cylinder pressure is also applied to a typical spring-controlled diaphragm metering valve 35 over the lines 25 and 30 and a line 36 to an input port 37 of the valve 35. The valve 35 is a conventional metering valve having the characteristics of providing master cylinder input pressure at the port 37 to output ports 38 and 39 for master cylinder pressure range from point 0 to point A (FIG. 2). For the range 0 to A, master cylinder pressure is applied to opposing ports of a differential pressure transducer 42 directly over a line 43 to the upper port of the transducer and indirectly through the metering valve 35 from the output port 39 and over a line 44 to the lower port of the transducer. For the master cylinder pressure range 0 to A the pressure in lines 43 and 44 is equal, and the difference in pressure therefore is zero. The transducer 42 functions to provide an electrical output signal on an electrical lead 46 whenever there is a difference in hydraulic pressure between the hydraulic lines 43 and 44. For the master cylinder pressure range from 0 to A, the pressure in the lines 43 and 44 is equal and therefore there is a null signal on the lead 46 corresponding to this condition.

Further depression of the brake pedal 16 increases the master cylinder pressure for the pressure range from point A to point B (FIG. 2). In this pressure range the output pressure from the metering valve 35 to the line 44 remains constant even though the master cylinder pressure is increased within the range of A to B. However, the pressure in a line 40 that is connected directly from the valve 35 output port 38 to the assembly 18 remains similarly constant only if the passage in valve 33 between the connecting lines 32 and 34 is closed. Such closing is carried out only if regenerative braking is appropriate. This is determined by means of a microprocessor 48 in which a signal may be generated to energize the solenoid operated valve 33 and thereby close the passage. The microprocessor 48 is state of the art and may be constructed of standard Intel 8080 A chips in accordance with the disclosure of a microprocessor module in *Near-Term Electric Vehicle Phase II—Mid-Term Summary Report,* submitted by General Electric Company to the U.S. Department of Energy, technical report No. SRD-78-073, pages 3.2-27 through 3.2-30, which report is incorporated herein by reference. Upon closure of the passage in vlave 33, the valve 35 is hydraulically interposed thereby between the master cylinder 22 and front brake assembly 18. The signal to energize the solenoid operated valve 33 is applied from the microprocessor 48 to a solenoid valve controller 49 to provide current on a lead 50 for application to the solenoid-operated valve 33 to energize the solenoid and close the passage connecting line 32 to line 34. The signal to energize the solenoid-operated valve 33 is generated only under the following predetermined conditions: that the brake pedal 16 is being depressed and this condition is manifested by actuation of a switch 52 connected to the brake pedal; that the accelerator is not being depressed and this condition is manifested by activation of a switch 53 that is connected to the accelerator pedal; that the condition of the power source 15 (battery) is such that it will accept a charge; and that the speed of the vehicle is favorable for regenerative braking. Signals corresponding to these conditions are applied to microprocessor 48 to generate the signal on lead 50 for energizing the solenoid operated valve 33 and to also generate a signal on an output lead 56 for application to the power conditioning unit 17 for controlling the motor generator 11 to regeneratively brake the wheels 12 and 14. The intensity of the signal 56 and therefore the amount of regenerative braking is a function of the difference in hydraulic pressure between the lines 43 and 44. This difference in pressure causes generation in the transducer 42 of an electrical signal on the lead 46 that is directly proportional to the difference. The signal is appropriately amplified in an amplifier 54 and applied to the microprocessor 48 for determination of the signal on lead 56. As illustrated in FIG. 2, as the master cylinder pressure increases from point A to B, the difference in pressure between the hydraulic lines 43 and 44 is represented by the vertical distance from line AB to the line AC for any given master cylinder pressure within that range, the pressure along line AC being the pressure in line 43 and the pressure along line AB being the pressure in line 44. Thus as the master cylinder pressure increases from A to B the signal on lead 46 increases in a corresponding manner for control of the motor generator to provide an amount of regenerative braking to the wheels 12 and 14 that is equivalent to front brake pressure represented along line AC.

Still further depression of the brake pedal 16 brings master cylinder pressure within a range represented by points B and C (FIG. 2). Within this range of master cylinder pressure the metering valve 35 characteristics provide an increasing hydraulic pressure on the lines 40 and 44 as the master cylinder pressure in line 36 is increased. This condition is represented by the line BC. Thus as the pedal 16 is further depressed the master cylinder pressure increases and the hydraulic pressure in the lines 40 and 44 increases causing an increasing amount of hydraulic pressure to be applied to the wheel assembly 18; and since the difference in hydraulic pressure between the lines 43 and 44 decreases within the range B to C, the amount of regenerative braking correspondingly decreases until, as indicated at point C, regenerative braking is eliminated and all braking is hydraulic.

Figure 3:
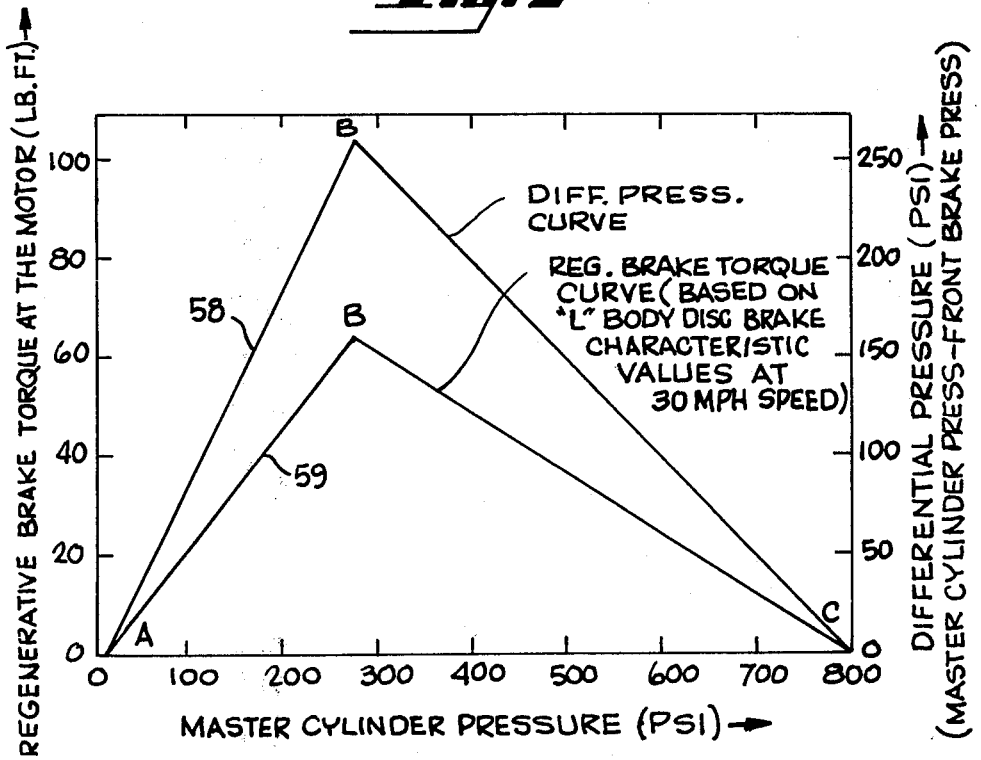
FIG. 3 is an illustrative diagram including a first curve relating to hydraulic pressure applied to braking as a function of hydraulic line pressure from the master cylinder and a second curve relating to regenerative brake torque applied to braking also as a function of master cylinder hydraulic line pressure, for the system of FIG. 1.

Thus, referring to FIG. 2, it is seen that from point 0 to A all braking is completely hydraulic; from point A to point B there is a constant amount of hydraulic braking and an increasing amount of regenerative braking, the maximum regenerative braking occurring at point B; from point B to C the amount of hydraulic braking increases while regenerative braking decreases; and from point C to D the braking is completely hydraulic since there is no pressure difference between the hydraulic lines 43 and 44. A curve 58 illustrating the difference in the pressure between the input port 37 and the output ports 38 and 39 of the valve 35 is illustrated in FIG. 3. The curve 58 is labeled with points A, B, and C that correspond to the points A, B, and C for master cylinder pressure in FIG. 2. In FIG. 3 it is seen that from 0 to A there is no difference in pressure between the input ports and output ports. This condition corresponds to the condition represented by line 0-A in FIG. 2. From point A to point B on curve 58 in FIG. 3 the differential pressure represented by the curve increases at a constant rate and this corresponds to the pressure at the output ports 38 and 39 remaining constant, while the pressure at the input port 37 increases as increasing pressure is applied to the brake pedal 16. From point B to point C in FIG. 3, the differential pressure between the input port and the output ports decreases as the brake pedal 16 is further depressed and this corresponds to the line BC in FIG. 2. The differential pressure represented by the curve 58 is applied to opposing ports of the differential pressure transducer 42 in which an electrical signal is generated on the lead 46 that corresponds to the amplitude of the differential pressure. This signal, after being amplified appropriately by the amplifier 54, is applied to the microprocessor 48 for controlling the motor generator 11 to apply regenerative braking to the wheels 12 and 14 in proportion to the signal on the lead 46. The regenerative braking torque applied to the wheels 12 and 14 may be represented by a curve 59 in FIG. 3 which increases and decreases in direct proportion to the differential pressure applied accross the transducer 42. The amplifier 54 is provided with zero and gain adjustments to amplify the signal on the lead 46 appropriately and input the same to microprocessor 48 to control the motor generator 11 to regeneratively torque the wheels 12 and 14 in an amount that when summed with the torque due to the hydraulicly applied pressure to the wheels results in a braking characteristic which follows the line 0-D in FIG. 2.

In order that the braking characteristics for the left front wheel 14 are identical with those for the wheel 12, a metering valve 71 and a solenoid-operated valve 72 that are identical to the valve 35 and valve 33, are provided for control of the hydraulic pressure applied to the assembly 20. Upon depression of the brake pedal 16 master cylinder pressure is applied over the line 27 to the metering valve 71 and solenoid-operated valve 72 and hence to the assembly 20 for applying brake pressure to the wheel 14 that is identical to the pressure applied to the wheel 12 for all master cylinder pressures. Since a separate control system for controlling the motor generator 11 for regeneration is not required for each wheel 12 and 14, one of the output ports in the metering valve 71 is capped and the electrical control system described hereinbefore for regeneratively braking the wheels 12 and 14 is used for controlling the regenerative braking of both wheels as described.

It will be noted that the hydraulic pressure in the lines 24 and 25 will be the same for all master cylinder pressures whether or not there is regenerative braking. For example, in the event of an electrical failure of the system 10, the solenoid operated valve 33 remains deenergized, the passage between lines 32 and 40 remains open, and full hydraulic pressure is applied thereby to the assembly 18 for all master cylinder pressures. Such an arrangement provides an added degree of safety in the event of an electrical failure; it further permits the use of completely hydraulic braking at the rear brakes since the braking characteristics are the same at all wheels whether or not regenerative braking is used. Moreover, since the pressure in the lines 24 and 25 is the same, whether the brakes are completely hydraulicly operated or supplemented with regenerative braking, the pressure applied to the brake pedal 16 requires the same effort as the effort for a completely hydraulic system and therefore gives the driver the same "feel" as a completely hydraulic conventional traditional braking system. It will also be seen that the system 10 provides a braking system having hydraulic and regenerative braking that is blended appropriately under varying conditions to provide smooth safe braking that is comparable to a completely hydraulic system. For example, it will be observed that maximum regenerative braking effort is at an intermediate level of braking effort at the pedal 16 so that for less braking effort there is less regenerative effect and at increased braking effort there is also less of a regenerative braking effect. This ensures that regenerative braking is not sharply introduced so that the start of regenerative braking is felt in a distinctive way from the hydraulic effort. The system also is susceptible of being easily arranged such as by electrical signal imput to the microprocessor 48 so that vehicle coast down is regenerative to further increase smoothness and electrical efficiency. It will be further observed that for hard braking applications such as required during an emergency, braking is entirely hydraulic. This is illustrated in FIG. 2 as the portion of the curve from C to D and beyond the point D.

It will be further observed that the characteristic of the metering valve 35 is such that for the hydraulic pressures corresponding to the ranges 0–A, C–D and beyond D on FIG. 2, the passages between the input port 37 and output ports 38 and 39 are open and hence the pressures at the inlet and outlet ports are same. As the input and output pressures of the metering valve are same, the pressure differential between the pressures on lines 43 and 44 is zero. This results in a null signal on the lead 46 which precludes regenerative braking and causes braking to be completely hydraulic.

It will be further noted that the metering valve 35 allows free flow of brake fluid through the valve when the brakes are not applied. This allows the fluid to expand and contract with temperature changes. Also the characteristics of the metering valve 35 is such that whenever the brakes are released, brake fluid is permitted to return through the openings in the valve plate of the metering valve 35 to the inlet port 37, unseating the check valve in the metering valve 35.

Figure 4:
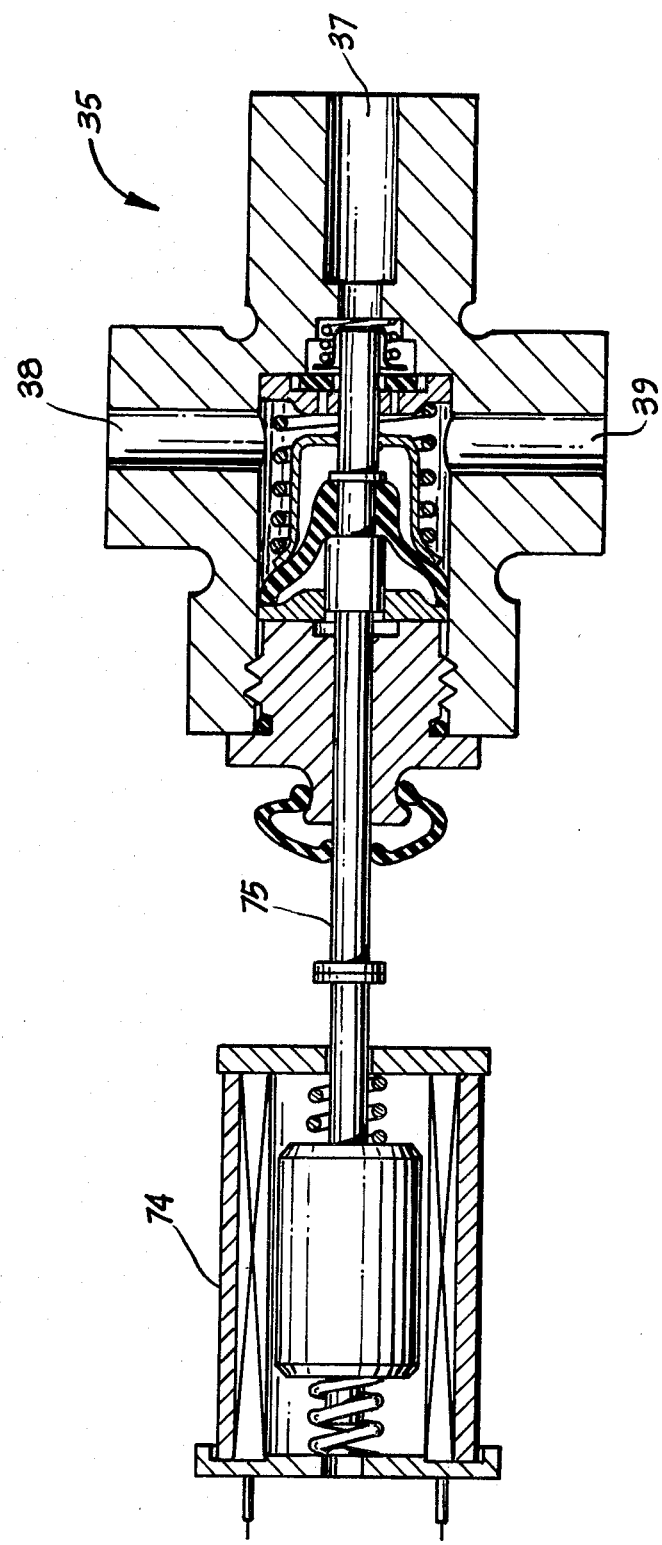
FIG. 4 is a cross-sectional view of a metering valve useful in the system of FIG. 1 and provided with a solenoid for changing the characteristics of the valve.

It may be found desirable to adjust the amount of maximum regenerative braking to suit the electrical current intake capability of the power source 15 (batteries) and thus ensure that there will be no excess damaging regenerative current into the source. This adjustment may be conveniently accomplished by providing solenoids 74 and 76 under control of the microprocessor 48 to position rods 75 and 77 into respective valves 35 and 77 to thereby modulate the force on the rods to vary the spring rate of the diaphragm of the valves. The tractive force on the solenoid armature rods is made directly proportional to the input voltage to the solenoids so that as the voltage is increased, the pressure range at ports 38 and 39 during which the pressure remains constant for increasing master cylinder pressure may be variously moved from A–B to such as to A' to B' or A" to B" as indicated in FIG. 2. The details of typical metering valves 35 and 71 and typical solenoids 74 and 76 are shown in FIG. 4.

In an actual embodiment of the invention, the metering valves 35 and 71 used were Kelsey-Hayes Company's pressure metering valves, experimental part No. DSK 42083; the pressure transducer 42 was a model DPT 361J-5C-F12 from Dynisco; the solenoid-operated valves 33 and 72 used were Marotta Scientific Controls, Incorporation's normally open 12 volt direct current operated valves, Model MV74H/part No. 209603; and the amplifier 54 was a model 414 AMUY-7 Strain Gauge Signal Conditioner from Ectron Corporation. It should be noted that in the actual embodiment, the metering valves 35 and 71 were not equipped with solenoids 74 and 76 and that in electrical vehicles being constructed for the U.S. Department of Energy and utilizing the system 10, the valves 35 and 71 will not be equipped with the solenoids 74 and 76.

What is claimed is:

1. A combined hydraulic and regenerative braking system, comprising:

a first wheel;

a brake assembly for said wheel;

a hydraulic brake line connected to said assembly;

means for creating increased pressure in said brake line for application to said brake assembly for actuating said brake assembly to brake said wheel;

a motor generator rotatably connected to said wheel; and means responsive to a predetermined level of said created pressure for controlling the degree of hydraulic braking and for controlling said motor generator to be driven as a generator by said wheel, said responsive means being responsive to hydraulic pressure in said brake line to control braking of said wheel to be completely hydraulic up to a first level of said created pressure, to control braking to be partially hydraulic at a constant hydraulic braking force and partially regenerative at a linearly increasing regenerative braking force from the first level of created pressure to a higher second level of said created pressure, to control braking to be partially hydraulic at a linearly increasing hydraulic braking force and partially regenerative at a linearly decreasing regenerative braking force from the second level of said created pressure to a third and still higher level of said created pressure, and to control braking to be completely hydraulic at a linearly increasing hydraulic braking force from the third level to all higher levels of said created pressure.

2. A combined hydraulic and regenerative braking system, comprising:

a first wheel;

a brake assembly for said wheel;

a hydraulic brake line connected to said assembly;

means for creating increased pressure in said brake line for application to said brake assembly for actuating said brake assembly to brake said wheel;

a motor generator rotatably connected to said wheel; and means responsive to a predetermined level of said created pressure for controlling the degree of hydraulic braking and for controlling said motor generator to be driven as a generator by said wheel, said responsive means including:

hydraulic metering means having an input and an output; and switching means for hydraulically interposing said metering means in said brake line between said pressure creating means at said metering means input and said brake assembly at said metering means output;

said metering means being operable upon being interposed to establish a pressure differential between said input and output; and transducing means for generating an electrical signal corresponding to said pressure differential.

3. The braking system of claim 2, wherein said switching means is a solenoid operated valve having a normally open passage connected in said brake line to bypass said input and output of said metering means, said braking system being completely hydraulically operated when said passage is open, and wherein said responsive means includes means for energizing said solenoid to close said passage and thereby interpose said metering means in said brake line.

4. The braking system of claim 2, wherein said metering means is a metering valve having said input connected to said pressure creating means and said output connected to said brake assembly and said transducing means is hydraulically connected across said metering valve input and output.

5. The braking system of claim 1, further including:
a second wheel;
a second brake assembly for said second wheel, said second assembly being connected directly to said brake line for direct and full application of all levels of pressure from said pressure creating means to said second assembly to brake said second wheel completely hydraulically with the same degree of braking effort as the combined hydraulic and regenerative braking effort applied to said first wheel.

6. A method for combining hydraulic and regenerative braking for braking a first wheel by application of hydraulic pressure from a pressure creating means through a brake line to a brake assembly associatd with said wheel and by selectively controlling a motor generator to be driven as a generator by said wheel, including the steps of:

creating increased pressure in said brake line for application to said brake assembly for actuating said assembly to brake said wheel;
selectively maintaining a differential pressure between said created applied pressure and said brake assembly to diminish the hydraulic braking in a predetermined amount; and
transducing said differential pressure to an electrical signal that is proportional thereto for controlling said motor generator to be driven as a generator by said wheel to a degree that is proportional to said signal to thereby apply regenerative braking effort to said wheel in an amount equal to said diminished hydraulic braking effort,
said differential pressure being maintained at a level to control braking of said wheel to be completely hydraulic up to a first level of said created applied pressure, to control braking to be partially hydraulic at a constant hydraulic braking force and partially regenerative at a linearly increasing regenerative braking force from the first level of said applied pressure to a higher second level of created applied pressure, to control braking to be partially hydraulic at a linearly increasing hydraulic braking force and partially regenerative at a linearly decreasing regenerative braking force from the second level of created applied pressure to a third and still higher level of said created applied pressure, and to control braking to be completely hydraulic at a linearly increasing hydraulic braking force from the third level to all higher levels of said created applied pressure.

7. The method of claim 6, wherein said differential pressure is selectively maintained by metering the pressure between said created applied pressure and said brake assembly.

* * * * *